United States Patent
Adams

(10) Patent No.: US 7,837,162 B2
(45) Date of Patent: Nov. 23, 2010

(54) SUCTION CUP WITH SOLAR CELL

(75) Inventor: William E. Adams, Portersville, PA (US)

(73) Assignee: Adams Mfg. Corp., Portersville, PA (US)

( * ) Notice: Subject to any disclaimer, the term of this patent is extended or adjusted under 35 U.S.C. 154(b) by 772 days.

(21) Appl. No.: 11/484,429

(22) Filed: Jul. 11, 2006

(65) Prior Publication Data

US 2008/0011917 A1 Jan. 17, 2008

(51) Int. Cl.
*A45D 42/14* (2006.01)
*F16B 47/00* (2006.01)

(52) U.S. Cl. .................... 248/205.5; 248/363; 248/683; 136/252

(58) Field of Classification Search .............. 248/205.5, 248/206.2, 206.3, 363, 683; 136/251, 252, 136/243
See application file for complete search history.

(56) References Cited

U.S. PATENT DOCUMENTS

| | | | |
|---|---|---|---|
| 1,532,308 A * | 4/1925 | Downing ................. | 248/205.5 |
| 1,534,214 A * | 4/1925 | Holt .............................. | 4/583 |
| 4,539,516 A | 9/1985 | Thompson | |
| 4,588,153 A | 5/1986 | Boston et al. | |
| 4,873,790 A | 10/1989 | Laterza | |
| 5,039,045 A * | 8/1991 | Adams et al. ............ | 248/206.2 |
| 5,237,764 A | 8/1993 | Gray | |
| 5,396,408 A | 3/1995 | Szczech, III | |
| 5,402,974 A | 4/1995 | Adams | |
| 5,414,405 A | 5/1995 | Hogg et al. | |
| 5,605,769 A | 2/1997 | Toms | |
| 5,645,254 A * | 7/1997 | Ng et al. .................. | 248/206.2 |
| 5,880,672 A | 3/1999 | Weaver | |
| 6,060,838 A | 5/2000 | Cantoni et al. | |
| 6,293,278 B1 * | 9/2001 | Diffley ....................... | 126/564 |
| 6,602,021 B1 * | 8/2003 | Kim ........................... | 404/16 |
| 6,814,335 B2 * | 11/2004 | Immerman ................. | 248/304 |
| 2004/0124325 A1 * | 7/2004 | Kwok ...................... | 248/205.8 |

\* cited by examiner

*Primary Examiner*—Anita M King
(74) *Attorney, Agent, or Firm*—Buchanan Ingersoll & Rooney PC

(57) ABSTRACT

A suction cup has a cup portion and a head attached to the cup portion. A solar cell is positioned within the head or the cup portion. The solar cell can be placed in a cavity in the head or cup portion or may be molded or formed into the suction cup. The contacts of the solar cell may be positioned so that an object can be hung on the suction cup and be powered by the solar cell. One can also provide a sensor and transmitter or alarm in or on the suction cup and connected to the solar cell such that when the suction cup is moved an alarm will sound.

9 Claims, 4 Drawing Sheets

SUCTION CUP WITH SOLAR CELL

FIELD OF INVENTION

The invention relates to suction cups of the type used to hold objects on flat surfaces, particularly window panes.

BACKGROUND OF THE INVENTION

Suction cups have been used for many years to hold objects on window panes and other slick surfaces. The suction cup consists of a flexible cup portion having a concave surface and a head extending from the surface. The head typically is cylindrical and may have a collar, tabs or other structures which facilitate the holding of objects on the suction cup. Suction cups with a slotted head such as disclosed in U.S. Pat. No. 4,588,153 to Boston et al. and my U.S. Pat. No. 5,402,974 have also been used to hold objects on windows.

To mount a suction cup on a flat surface one presses the cup portion against the flat surface. This causes the cup portion to flex driving out the air between the concave bottom of the suction cup and the flat surface. Memory in the cup portion attempts to return the cup portion to its original shape thereby creating a vacuum between the flat surface and the suction cup. The ability of the suction cup to hold objects depends upon the strength of the vacuum created. If the cup portion has few irregularities and the surface is very smooth, the suction cup may stay in place for months or even years. Over time air from outside the suction cup migrates into the region between the flat surface and curved portion of the cup reducing the vacuum. After a sufficient amount of air has entered that region, the suction cup will come loose from the surface. The rate at which air enters that region will depend upon both the smoothness of the surface and the quality of the suction cup. Air infiltration may also be increased by vibration or movement of the cup or the surface to which it is attached.

Many suction cups are made from a clear plastic such that the cups are less visible. Most suction cups today are made from polyvinyl chloride, thermoplastic elastomers, or silicon. One example of a popular suction cup is disclosed in my U.S. Pat. No. 5,049,035.

Many products have been developed which are powered by solar cells. Such products range from clocks to lights. Furthermore, there are several window decorations which are powered by solar cells that are attached to a window by suction cups. An example of such decorations is disclosed in U.S. Pat. No. 5,237,764. Solar cells have been used to charge batteries. Thompson in U.S. Pat. No. 4,539,516 discloses a solar battery energizer which is hung in a window and uses a solar cell to charge a battery. A suction cup is provided to hang the device on a window.

Although suction cups have been used to hold solar powered devices on windows, the art has not incorporated a solar cell into the suction cup. Doing so, however, would enable a variety of objects to be readily powered. They may be remote, or hung from one or more suction cups such that solar cells in the suction cup may power the device.

SUMMARY OF THE INVENTION

I provide a suction cup having a solar cell molded or fixed into either the head or cup portion of the suction cup. Preferably the suction cup is made of a light transmissive material. In addition, I prefer that the light transmissive material be molded to surround the solar cell. This can be done using insert molding. One can also form a solar cell as part of the suction cup by injecting molding various layers of required material.

I prefer to provide the solar cell in or below the head of the suction cup and provide contacts on the suction cup. Contacts are positioned so that one can hang an object having electrical contacts on the head. Electrical contacts would then engage the contacts in the object of the solar cell. A rechargeable battery, of the type found in hearing aids, for instance, may be connected to the cell to provide power to the object when the sun is not shining.

I also prefer to provide a series of suction cups each having a solar cell wherein the solar cells are interconected to provide a power source.

It is known that suction cups of a frusto-conical or spherical shape or cross section will focus light in an area behind the suction cup. Proper placement of the solar cell in the suction cup takes advantage of this focusing. It captures maximum light for the solar cell, and allows for the proper cross section of the cup to focus the greatest amount of light on the smallest, least expensive cell, even when not in direct sunlight.

Other objects and advantages of the present invention will become apparent from the description of certain present preferred embodiments shown in the drawings.

DESCRIPTION OF THE PREFERRED EMBODIMENTS

Figure 1:
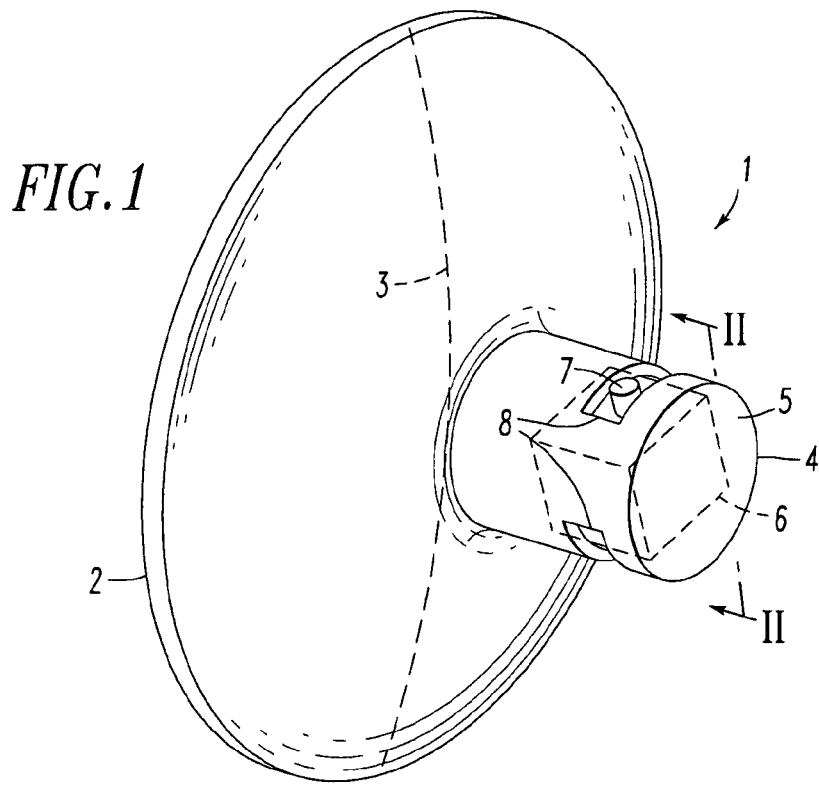
FIG. 1 is a perspective view of a present preferred embodiment of my suction cup for solar cell.
Figure 2:
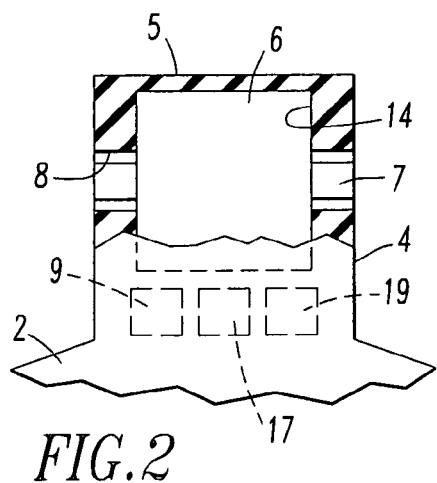
FIG. 2 is a sectional view taken along line II-II in FIG. 1.
Figure 3:
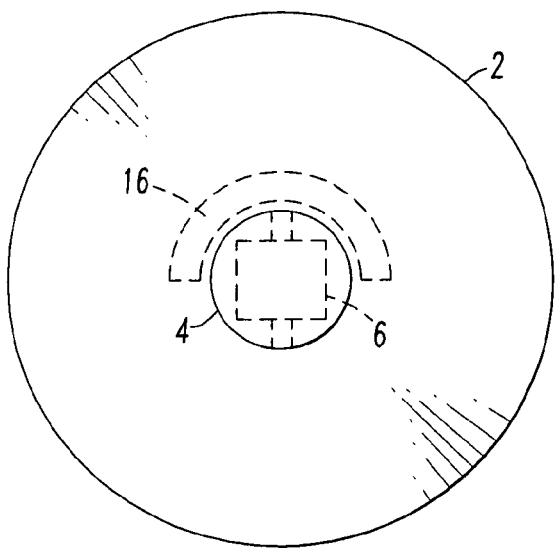
FIG. 3 is a front view of the suction cup shown in FIG. 1.
Figure 4:
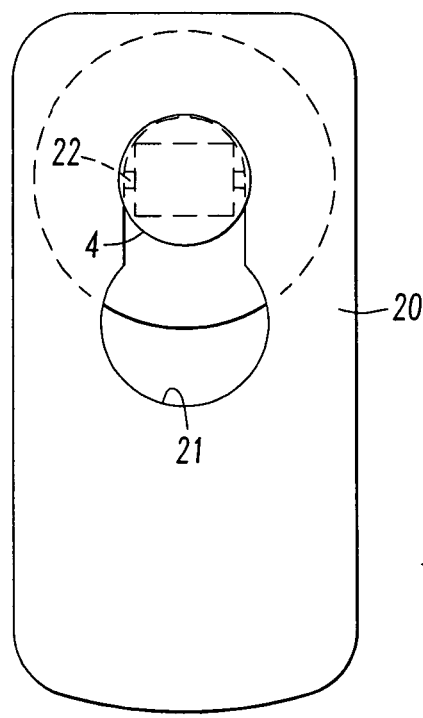
FIG. 4 is a front view of an object hung on the suction cup shown in FIGS. 1, 2 and 3.

Referring to FIGS. 1, 2 and 3 I provide a suction cup 1 having a cup portion 2 and head portion 4. The bottom of the cup portion 2 has a concave surface 3 which is pressed against a mounting surface. Within a cavity 14 in the head 4 of the suction cup I provide a solar cell 6 having contacts 7. I prefer to provide a pair of slots 8 in the head of the suction cup into which the contacts 7 of the solar cell extend. Then, one can hang an object 20 shown in FIG. 4 on the head of the suction cup. The object has a pair of contacts 22 adjacent a key hole slot 21. The object is hung on the head 2 of the suction cup in a manner so that the contacts 22 of the object engage the contacts 7 of the solar cell. One can provide a small rechargeable battery 9 in the suction cup to provide power to the object when the sun is not shining.

Yet another option is to provide a sensor 17 and transmitter 19 in the suction cup with the battery. The sensor 17 could activate the transmitter when the suction cup is moved to cause an alarm to sound. That alarm may be remote, or may be the object hung on the suction cup. All can be powered by the solar cell. Hence, the suction cup could be used as a burglar alarm, on a door or window and as a thermal alarm in a refrigerator.

As can be seen in FIG. 2, I prefer to mold the solar cell 6 into the head 4 such that the top surface 5 of the head covers the active surface 9 of the solar cell. A suction cup constructed in this way would be placed on an outside surface of a window with the top surface 5 facing the sun. Alternatively, the solar cell may be reversed and placed lower in the head 2 than shown. In this orientation the active surface would face the cup portion and the suction cup would be placed on the inside surface of the window. It is also possible to provide a solar cell having opposite faces which are both activated by light. A suction cup with this type of solar cell could be placed upon either the inside surface or the outside surface of a window.

Although I prefer to mold the solar cell into the head of the suction cup as shown in FIGS. 1 and 2, there are certain solar cells which can be configured to conform to the cup portion of the suction cup. As an alternative, one can place the solar cell on the upper part of the cup portion adjacent the head where minimal flexing occurs. This alternative position 16 is indicated in dotted line in FIG. 3. The solar cell may completely encircle the head or have a semicircular shape as indicated in FIG. 3. It is also possible to form a solar cell in the cup portion by creating conductive or semi-conductive layers or regions within the suction cup which together operate as a solar cell. These layers may be films which are insert molded into the suction cup or mixtures of materials that are co-injected to create the solar cell. Each layer would work with the layers above and below that layer to maximize utilization of the light and adhesion to the surface. The layers may also be molded into the cup by putting the layer into the mold cavity and injecting the material so that the layer is attached to the cup. It is well known that solar cells formed of layers are most efficient. Adequate efficiency may be obtained by putting the materials that transform solar power into electricity directly into the cup, using dissimilar injection or extrusion materials whose different characteristics roughly approximate the use of thin layers working in conjunction when used in conjunction with the elements and compounds that actually change light into usable electricity. One embodiment uses co-injection to put the different materials into the mold cavity. Such injections may be precisely timed to put the desired material in the desired position in the finished product. The same techniques may be used for extrusions of dissimilar materials which will work together to achieve the desired end.

Figure 5:
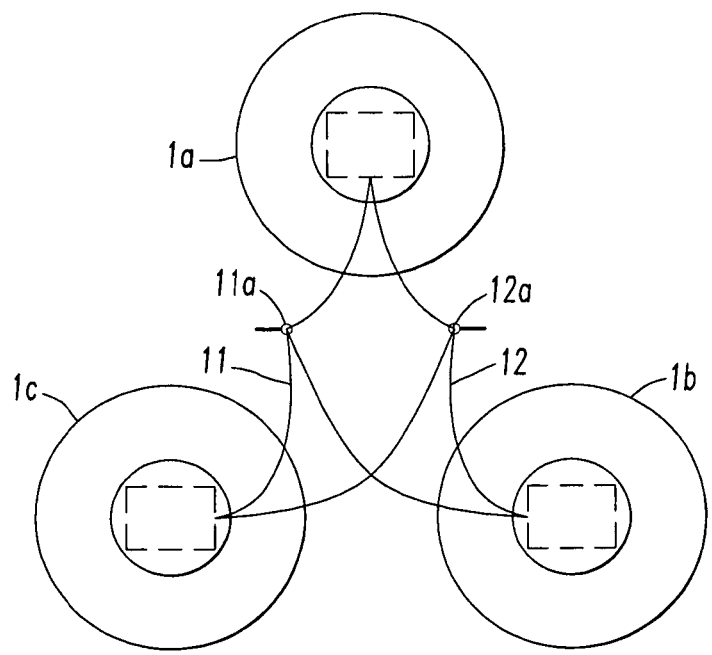
FIG. 5 is a front view of a power source formed by a set of suction cups of the type shown in FIGS. 1, 2 and 3.

Turning now to FIG. 5, I provide three suction cups 1a, 1b and 1c of the type shown in FIGS. 1, 2 and 3. I further provide a set of leads 11, 12 which extend from the contacts of each of the solar cells. The leads are then coupled together to form contact points 11a and 12a which can be coupled to a product to be powered by a solar cell.

It is not necessary that the solar cell be molded into the suction cup. Another way to secure the solar cell to the suction cup is to provide a slot in the head of the suction cup similar to the slot in my U.S. Pat. No. 5,402,974. That slot would be configured to form a cavity sized to receive and hold the suction cup. The solar cell would be placed into the suction cup by spreading at least two of the arms of the head wide enough to fit the solar cell between them. The solar cell is inserted between the spread arms and then the arms are allowed to retract to their original position and grip the solar cell or secure the solar cell within the cavity in the head.

Figure 6:
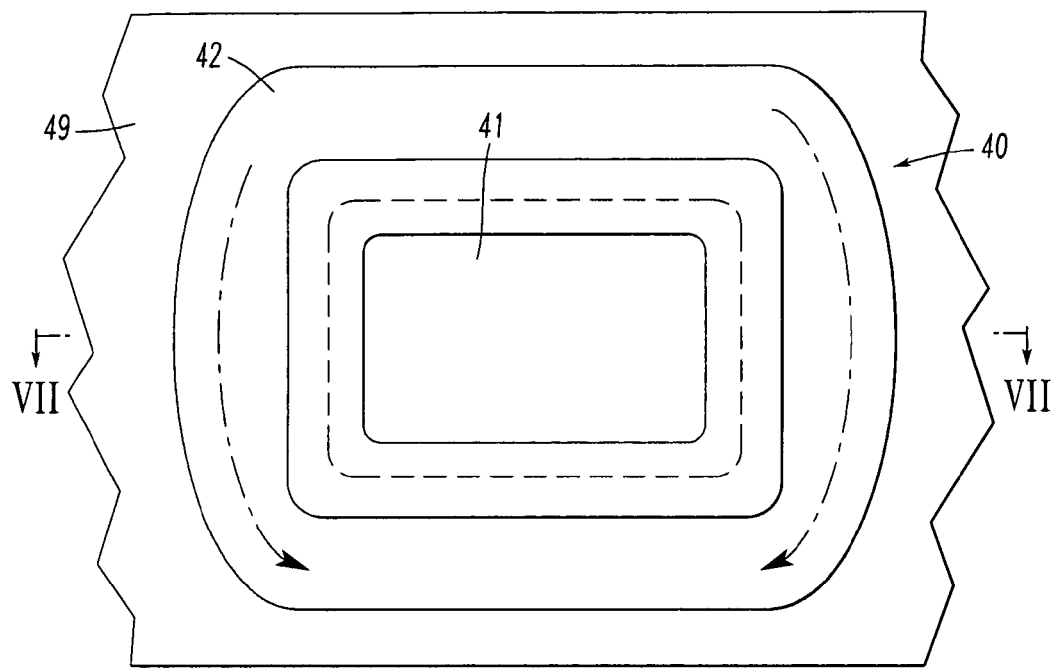
FIG. 6 is a perspective view of a second present preferred embodiment.
Figure 7:
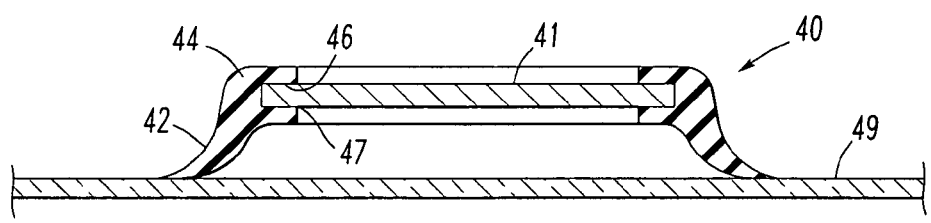
FIG. 7 is a sectional view taken along lines VII-VII in FIG. 6.

A second present preferred embodiment 40 shown in FIGS. 6 and 7 has a cup portion 42 and a head 44. The suction cup 40 is shown affixed to a piece of glass 49. The head 44 is open and has a channel 46 about its inside surface 47. The channel 46 is sized to receive the edge of a solar cell 41 such that when the solar cell is attached to the head an airtight seal is formed between the head 44 and the solar cell 41. Essentially, this forms a reasonably air-tight gasket around the solar cell. This cell may be formed conventionally, or may be extruded, or co-extruded in layers. One may provide a bead of silicon or other appropriate material around the edges of the solar cell to improve the seal. It should be understood that the surfaces and structure of the selected solar cell will be designed to be reasonably impenetratable to air, as is true with most solar cells.

Figure 8:
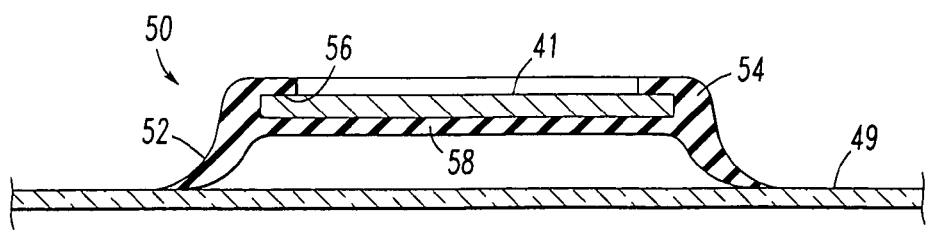
FIG. 8 is a sectional view similar to FIG. 6 of a third present preferred embodiment.

A third present preferred embodiment 50 shown in FIG. 8 is similar to the second embodiment and has a cup portion 52 and a head 54. There is a channel 56 on the inside surface of the head which receives a solar cell 41. Unlike the second embodiment, head 54 is not open but has a base 58 below the channel 56.

The present preferred cups may be circular, square, or oval shape, and the head can be generally cylindrical or otherwise shaped to most effectively hold the solar cell. The opening in the head 42, 52 which receives the suction cup may be any shape which corresponds to the solar cell including rectangular or square.

One advantage of molding the solar cell into the head of the suction cup or inserting the solar cell into a slot or cavity in the head of the cup is that the orientation of the active surface of the solar cell will remain fixed relative to the cup portion. Hence, the orientation of the solar cell will also be fixed relative to a surface on which the suction cup is attached. Then the solar cell may be at a predetermined angle relative to the window pane which can improve the light receiving ability of the solar cell.

Figure 9:
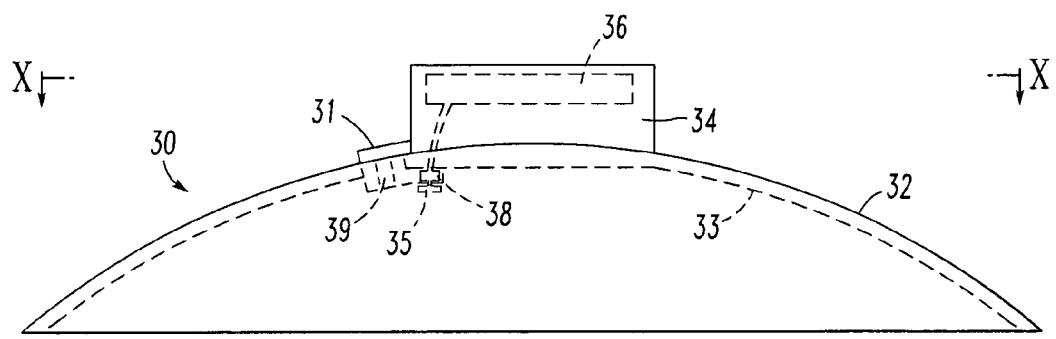
FIG. 9 is a perspective embodiment of the second present preferred embodiment of the invention in which the suction cup also contains a small vacuum pump.
Figure 10:
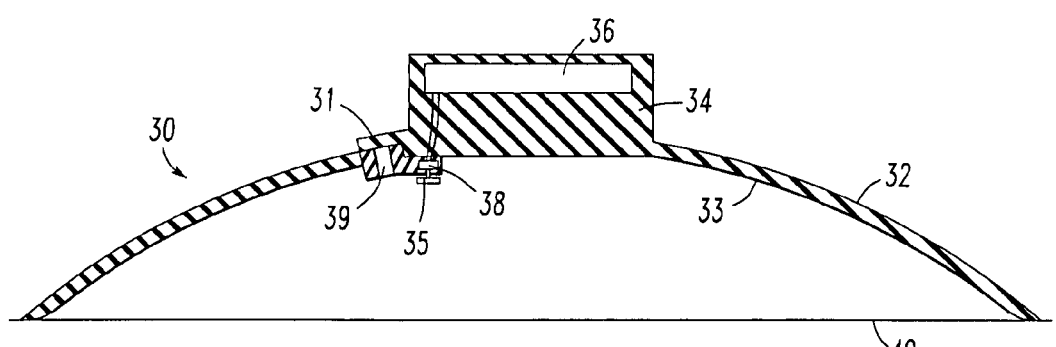
FIG. 10 is a sectional view taken along the line X-X in FIG. 9.

Yet another embodiment in my suction cup with solar cell is shown in FIGS. 9 and 10. This suction cup 30 has a cup portion 32, head 34 and solar cell 36 contained within the head. I further provide a small vacuum pump 38 on the suction cup. The vacuum pump is powered by the solar cell and periodically removes air from the region adjacent the inside surface 33 of the suction cup. This air is removed through a small channel 39 provided between the inside surface 33 and pump 38. A pressure switch 35 is connected to the pump 38. When the pressure within the chamber defined by the inside surface 37 of the cup portion 32 and the surface 49 in which the suction cup is mounted reaches a predetermined level the pressure switch 35 activates vacuum pump 38. Air is drawn from that chamber through channel 39 causing flap 31 to open and expel air. Consequently, the vacuum which keeps the suction cup in place can be maintained.

Although I have shown and described certain present preferred embodiments of my suction cup with solar cell, it should be distinctly understood that the invention is not limited thereto and may be variously embodied within the scope of the following claims.

I claim:
1. A suction cup comprised of:
a cup portion having a concave surface,
a head attached to the cup portion,
a solar cell positioned within a cavity in at least one of the head and the cup portion, wherein at least one slot is provided in the head of the suction cup and the solar cell further comprises at least one electrical contact that extends into the at least one slot; and
an object having electrical contacts positioned on the head of the suction cup in a manner so that the electrical contacts of the object engage the electrical contacts of the solar cell.

2. A suction cup comprised of:
a cup portion having a concave surface,
a head attached to the cup portion, and
a solar cell positioned within a cavity in at least one of the head and the cup portion, wherein the head is comprised of at least two arms which together define the cavity and the solar cell is positioned within the cavity.

3. A suction cup comprised of:
a cup portion having a concave surface,
a head attached to the cup portion, and
a solar cell positioned within a cavity in at least one of the head and the cup portion, wherein the head has an inside surface which defines the cavity such that the cavity is open and passes through the head, and which inside surface has a channel in which edges of the suction cup are contained, the edges of the solar cell and the channel forming an airtight seal.

4. A suction cup comprised of:
a cup portion having a concave surface,
a head attached to the cup portion, and
a solar cell positioned within a cavity in at least one of the head and the cup portion, wherein the head is comprised of at least two flexible arms that together define a gripping device which holds the solar cell.

5. A suction cup comprised of:
a cup portion having a concave surface,
a head attached to the cup portion,
a solar cell positioned within a cavity in at least one of the head and the cup portion, and a vacuum pump attached to the suction cup and powered by the solar cell, the vacuum pump positioned and configured to draw air away from the concave surface of the cup portion of the suction cup.

6. A suction cup comprised of:
a cup portion having a concave surface,
a head attached to the cup portion,
a solar cell positioned within a cavity in at least one of the head and the cup portion, and a sensor attached to the suction cup to sense movement of the suction cup.

7. The suction cup of claim 6 also comprising at least one of a transmitter and an alarm connected to the sensor.

8. The suction cup of claim 7 wherein the at least one of the transmitters and the alarm are connected to the solar cell.

9. A power source comprised of a plurality of suction cups each suction cup comprised of:
a cup portion having a concave surface,
a head attached to the cup portion, and
a solar cell molded into at least one of the head and the cup portion; and
wherein the solar cell in each suction cup is connected to a solar cell in another suction cup.

* * * * *